US012244123B2

(12) United States Patent
Meyer et al.

(10) Patent No.: US 12,244,123 B2
(45) Date of Patent: Mar. 4, 2025

(54) SPARK GAP ARRANGEMENT

(71) Applicant: Phoenix Contact GmbH & Co. KG, Blomberg (DE)

(72) Inventors: Thomas Meyer, Ottenstein (DE); Viktor Okel, Blomberg (DE)

(73) Assignee: PHOENIX CONTACT GMBH & CO KG, Blomberg (DE)

( * ) Notice: Subject to any disclaimer, the term of this patent is extended or adjusted under 35 U.S.C. 154(b) by 141 days.

(21) Appl. No.: 18/307,140

(22) Filed: Apr. 26, 2023

(65) Prior Publication Data

US 2023/0352914 A1 Nov. 2, 2023

(30) Foreign Application Priority Data

Apr. 28, 2022 (DE) ..................... 10 2022 110 329.3

(51) Int. Cl.
*H01T 4/02* (2006.01)

(52) U.S. Cl.
CPC .................................... *H01T 4/02* (2013.01)

(58) Field of Classification Search
CPC .. H01R 13/518; H01R 13/506; H01R 13/514; H01R 13/648; H01R 13/502; H01R 13/424; H01R 13/6587; H01T 1/00–14; H01T 4/02–20
See application file for complete search history.

(56) References Cited

U.S. PATENT DOCUMENTS

| | | | | |
|---|---|---|---|---|
| 8,890,393 | B2 | 11/2014 | Krauss et al. | |
| 10,916,920 | B2 | 2/2021 | Meyer et al. | |
| 2013/0278129 | A1* | 10/2013 | Krauss | H01T 4/16 313/123 |

FOREIGN PATENT DOCUMENTS

| | | | |
|---|---|---|---|
| DE | 202013102647 | U1 | 6/2013 |
| DE | 102016114787 | A1 | 5/2017 |

* cited by examiner

*Primary Examiner* — Bryan R Perez
(74) *Attorney, Agent, or Firm* — Calderon Safran & Wright P.C.; David S. Safran

(57) ABSTRACT

A spark gap arrangement with at least three electrodes and with at least two holding frames, which are arranged flat one on top of the other, wherein each of the holding frames has an edge that surrounds a recess for accommodating at least one electrode, wherein at least one receptacle opening is made in the edge of at least one holding frame, in which opening a control element is arranged, and wherein the holding frames are arranged offset relative to one another around their central axis perpendicular to the plane of the holding frame, in such a way that the receptacle opening of a first holding frame is located above an electrode which is accommodated in a second holding frame arranged underneath, so that the control element arranged in the receptacle opening of the first holding frame makes contact with the electrode accommodated in the second holding frame arranged underneath.

12 Claims, 6 Drawing Sheets

SPARK GAP ARRANGEMENT

BACKGROUND OF THE INVENTION

Field of the Invention

Figure 1:
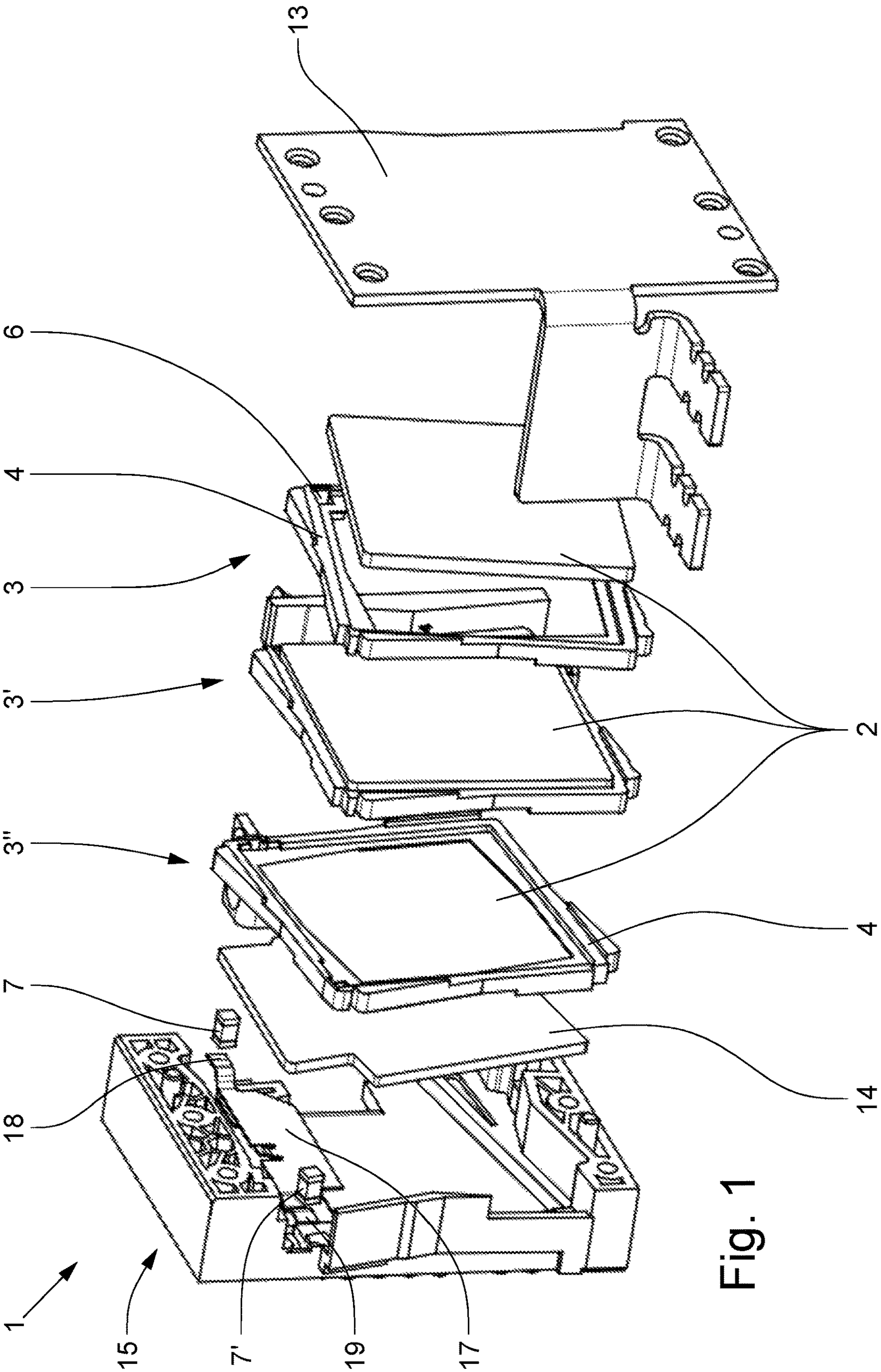

The invention relates to a spark gap arrangement with at least three electrodes and with at least two holding frames, which are arranged flat one on top of the other, wherein the holding frames in each case have an edge that surrounds a recess for accommodating at least one electrode. In addition, the invention also relates to a holding frame for such a spark gap arrangement.

Description of the Related Art

Overvoltage protectors have been known in a wide variety of designs from the state of the art and are used for protecting electrical devices or lines from overvoltages, which can be caused by, for example, lightning strikes or defects in technical systems. In this case, spark gap arrangements with multiple electrodes have been used for decades in the field of overvoltage protection of electrical devices and systems. For discharging high overvoltages while simultaneously ensuring a high power-follow current extinguishing capacity, multi-spark gaps are commonly used, which because of their design are frequently also referred to as stack spark gaps. Such stack spark gaps consist of multiple electrodes and multiple insulation units, which are arranged between the individual electrodes, so that in each case, one insulation unit is located between two electrodes, which unit has an opening in the center so that two electrodes form one spark gap. In this case, the electrodes are in general designed as circular or rectangular graphite disks, between which correspondingly shaped circular or frame-shaped insulation units are then arranged. The insulation units are in this case frequently designed as thin insulation foils made of plastic, for example PTFE, and have a thickness of in general less than 1 mm.

Different variants are known from experience, such as the individual electrodes and the individual insulation units [that] can be connected to form a stack spark gap. Frequently, for this purpose, large-area contact plates are used, which form the front sides of the stack spark gap and are braced via multiple guide rods in the axial direction by being screwed together, so that the individual electrodes and the individual insulation units are clamped between the contact plates in their stack-like arrangement. When the guide rods that are arranged on the outside between the contact plates are directed past the individual electrodes, this ensures that the required installation space is relatively large.

A stack spark gap is known from German Utility Model DE 20 2013 102 647 U1, in which the installation space or space requirement is reduced wherein the individual electrodes are perforated in the middle and the contact plates arranged on the front sides of the stacked electrodes are connected to one another by a guide rod, which extends through the perforations of the individual electrodes and the perforations of the circular insulation units. By using only one guide rod and its interior arrangement, a stack spark gap can be produced, whose space requirement is not significantly greater than the space requirement of the stacked electrodes.

German Patent Application Publication DE 10 2016 114 787 A1 discloses a carrier unit for spark gaps that can be connected in series and stacked, which unit consists of an insulation element that has a recess for the electrode.

According to a variant embodiment, the insulation element is designed so that it receives an individual electrode, wherein then multiple insulation elements are stacked one on top of the other. In addition, a radial opening is made in the insulation element, which opening is connected to the receptacle for the electrode, so that the electrode can be brought into contact via the opening on its radial outside surface.

German Patent Application Publication DE 10 2011 102 864 A1 and corresponding U.S. Pat. No. 8,890,393 B2 also disclose a stack spark gap with multiple individual spark gaps connected in series, wherein the individual electrodes are arranged in each case in an insulation element. The insulation elements have in each case a recess for accommodating a disk-like electrode and a receptacle for a control element, wherein the receptacle for the control element is connected to the recess for the electrode. In this case, a control element is connected via a contact spring to the edge of the electrode, so that a triggering of the individual electrodes of the stack spark gap can be achieved via the control elements.

German Patent Application Publication DE 10 2018 118 898 B3 and corresponding U.S. Pat. No. 10,916,920 B disclose a holding arrangement for multiple electrodes, which consists of at least two holding frames, which can be stacked flat one on top of the other. In the individual holding frames, in each case three recesses are made beside one another for accommodating in each case one electrode per recess, so that because of the stacking of multiple such holding frames, three stack spark gaps arranged beside one another can be produced. In the individual holding frames, in addition to the recesses for the electrodes, in each case a corresponding number of openings connected to the recesses are also made, through which openings the outside surfaces of the individual electrodes can be brought into contact. In this case, the openings are made on a longitudinal side of the holding frame, so that contact with the individual electrodes can be made from this side.

Known from the state of the art are various configurations of stack spark gaps, in which the individual electrodes are arranged in each case in a frame-like insulation element. To influence the ignition behavior of the stack spark gap, the individual disk-like electrodes are brought into contact on their narrow side, i.e., on their outside surface arranged in the longitudinal extension of the stack spark gap. To this end, it is already known to make a recess for accommodating a control element in the insulation element or the holding frame, which control element is connected via a missing contact element to the narrow side of the respective electrode.

With an increasing degree of integration, increasingly thinner electrodes are used in the spark gap arrangement, in particular in the stack spark gaps. This ensures that making contact between the disk-like electrodes and the control elements is increasingly more difficult on the narrow side, especially since the necessary insulation intervals between the control elements also have to be taken into consideration. Making direct contact between the narrow side of the electrodes and wireless control elements is in this case in general no longer possible.

SUMMARY OF THE INVENTION

The object of this invention is therefore to provide a spark gap arrangement, which makes contact possible between individual electrodes even when especially narrow electrodes are used. In addition, a holding frame is to be provided in which such a spark gap arrangement can be used.

This object is achieved in the above-described spark gap arrangement wherein at least one receptacle opening is made in the edge of at least one holding frame, in which opening a control element is arranged. In addition, the individual holding frames are arranged offset relative to one another around their central axis M that is arranged perpendicular to the plane of the holding frame, in such a way that the receptacle opening of a first holding frame is located above an electrode that is accommodated in a second holding frame arranged underneath. As a result, the possibility is provided that a control element arranged in the receptacle opening of the first holding frame makes contact with the electrode that is accommodated in the second holding frame arranged underneath, wherein the electrode is brought into contact not on the narrow lateral surface, i.e., the narrow side, but rather on the front side, the face, or the back side, which has a significantly larger surface than the narrow lateral surface.

Even if the spark gap arrangement according to the invention in principle can also have only three electrodes and two holding frames, the spark gap arrangement preferably consists of multiple electrodes and accordingly also multiple holding frames, so that the spark gap arrangement is a multi-spark gap or stack spark gap. The individual holding frames—and with them also the electrodes accommodated within—are then arranged as a stack that is mounted offset around the central point.

According to a preferred configuration of the invention, at least one receptacle opening in the holding frame is arranged close to a corner of the holding frame. The fact that the receptacle opening is arranged close to a corner of the holding frame makes it possible for the angle at which the individual holding frames, arranged one on top of the other, have to be arranged offset relative to one another to be relatively small. The individual holding frames are in this case arranged offset relative to one another to such an extent that the electrode arranged underneath in the area of a corner can be brought into contact via a control element arranged in a receptacle opening. Depending on the shape of the holding frame, which in general has an approximately rectangular basic shape, in this case offset angles of less than 15°, in particular less than 10°, for example 7.5°, can be sufficient.

According to an advantageous configuration of the invention, the individual holding frames in each case have a collar-shaped support section facing inward toward the central axis M, on which in each case at least one electrode comes to rest. The electrodes are thus not—or at least not only—held in their positions by the edge of the holding frame surrounding the recess even when the recesses are adapted to the outside dimensions of the electrodes, but also by the electrodes in each case resting with their edge on the collar-shaped support section of the holding frame. The support section is in this case set back relative to the edge of the holding frame in the direction of the central axis M. In this case, an electrode can come to rest on both sides of the collar-shaped support section.

In this case, the collar-shaped support section simultaneously also assumes the function of the otherwise commonly used insulation foils between the individual electrodes in the stack spark gaps. Because the individual electrodes are adjacent to the support section of the respective holding frame, two of the electrodes that are at least partially accommodated by a holding frame thus are at a set distance apart that is preset by the thickness of the support section. In this case, a spark gap arrangement can be produced that has very small dimensions overall, in particular in the longitudinal extension of the spark gap arrangement or the stack spark gap.

If a spark gap arrangement has two holding frames, a total of three electrodes can be accommodated by the two holding frames, wherein the central electrode is arranged between two holding frames, and thus is accommodated by the two holding frames together. The two outer electrodes, however, rest only with a front side, the face, or the back side on a support section of a holding frame while the respective other front side is brought into electrical contact by a contact plate and is held in the holding frame. A spark gap arrangement with n holding frames can thus accommodate n+1 electrodes. Since the two outer electrodes can make contact in each case via a contact plate, n−1 control elements can be provided in such a spark gap arrangement, which elements accordingly make contact with n−1 electrodes.

It was previously stated that the holding frames can have approximately a rectangular shape. This does not rule out, however, that the holding frames have an outside contour and an inside contour that in each case deviates from that of a rectangle. The outside contour of the holding frame that deviates from a rectangle can in this case be used in particular to make space available for the arrangement of the receptacle opening for the control element in the edge of the holding frame. To this end, for example, the edge of the holding frame can have a section projecting outward, wherein then the receptacle opening for the control element is made in the area of the section.

If the holding frame has a collar-shaped support section facing inward, the inside contour of the holding frame is determined by the inside edge of the support section. According to a preferred embodiment, the collar-shaped support section can in this case have an octagonal inside edge, wherein individual inside angles can have different values. If, in the spark gap arrangement according to the invention, two holding frames are arranged offset relative to one another at an angle $\alpha$, it is preferably provided that four inside angles $\delta_1$ have a value of $90°+\alpha$, and four inside angles $\delta_2$ have a value of $180°-\alpha$. The different inside angles $\delta_1$ and 82 are in this case arranged or designed to alternate relative to one another in the peripheral direction.

In this preferred configuration of the spark gap arrangement or the holding frame, the actual shape of the holding frame, in particular its inside contour, is thus designed based on at what angle individual holding frames are arranged offset relative to one another, or the offset angle between the individual holding frames depends on the actual shape of the holding frames.

According to another advantageous configuration of the spark gap arrangement according to the invention, the individual holding frames are designed in such a way that they are halted in their arrangement that is offset relative to one another. For this purpose, the positioning of the individual holding frames relative to one another is also simplified and ensures that in the mounting of the spark gap arrangement, the position of the individual holding frames relative to one another, in particular the angle at which adjacent holding frames are offset relative to one another, no longer changes by accident. Regarding the configuration of the halting between the individual holding frames, there are various options. For example, the holding frames can in each case have at least one halting element on at least one side, wherein two halting elements of two holding frames work together when the two holding frames are stacked one on top of the other in the provided arrangement, offset relative to one another.

As an alternative, or in addition, the holding frames can in each case have at least one latching element on the face and a mating latching element on the back side, wherein the latching element of a holding frame engages in a mating latching element of a second holding frame when the two holding frames are stacked one on top of the other offset relative to one another at the provided angle α. As latching elements, for example, pin-like tenons can be provided, and as mating latching elements, corresponding mortises can be provided.

The individual electrodes of the spark gap arrangement are preferably designed as rectangular, in particular square, thin disks made of graphite or a tungsten-copper composite material. The thickness of the electrode disks can in this case be less than 5 mm, in particular less than 3 mm.

The above-mentioned object is achieved in the case of a holding frame for a corresponding spark gap arrangement with the features of claim 9. The holding frame has an edge that surrounds a recess for accommodating an electrode, wherein the recess is adapted to the outside dimension of the electrode. According to the invention, it is provided in this case that at least one receptacle opening for accommodating a control element is made in the edge of the holding frame.

Regarding the advantageous configurations of the holding frame, reference can be made to the above-mentioned corresponding embodiments as regards the spark gap arrangement. The holding frame thus preferably has a collar-shaped support section, facing inward toward the central axis M of the holding frame, for at least one electrode, wherein the support section is preferably set back relative to the edge of the holding frame in the direction of the central axis M. In addition, in the case of the holding frame, preferably the outside contour and the inside contour are configured so that they deviate from that of a rectangle, wherein in particular, the collar-shaped support section has an octagonal inside edge. The inside edge in this case preferably does not correspond to a regular octagon with eight inside angles δ of the same size. Rather, the inside edge preferably has four inside angles $\delta_1$ and four inside angles $\delta_2$, which are arranged alternately, relative to one another. The inside angle $\theta_1$ is in this case 90°+α, and the inside angle $\theta_2$ is 180°−α.

The holding frame can be made of a plastic or a ceramic material and can have a relatively small thickness of preferably less than 10 mm, in particular less than 5 mm. In principle, however, other insulation materials for the holding frame and other dimensions, in particular other thicknesses, are also possible.

In particular, there are a number of options for further developing and configuring the spark gap arrangement according to the invention as well as the holding frame. To this end, reference is made both to the subordinate claims as well as to the following description of preferred embodiments with reference to the accompanying drawings.

DETAILED DESCRIPTION OF THE DRAWINGS

Figure 2:
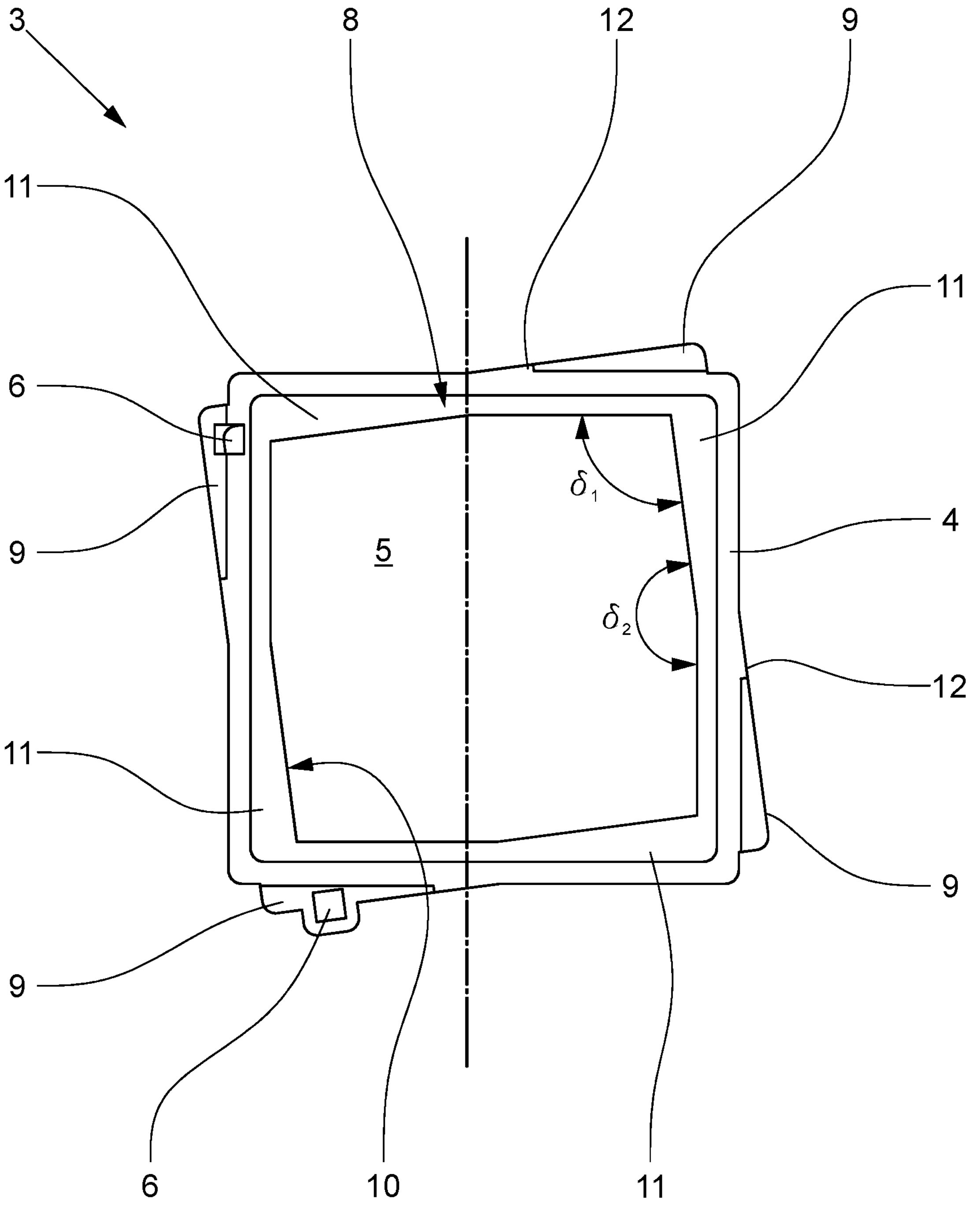
Figure 3:
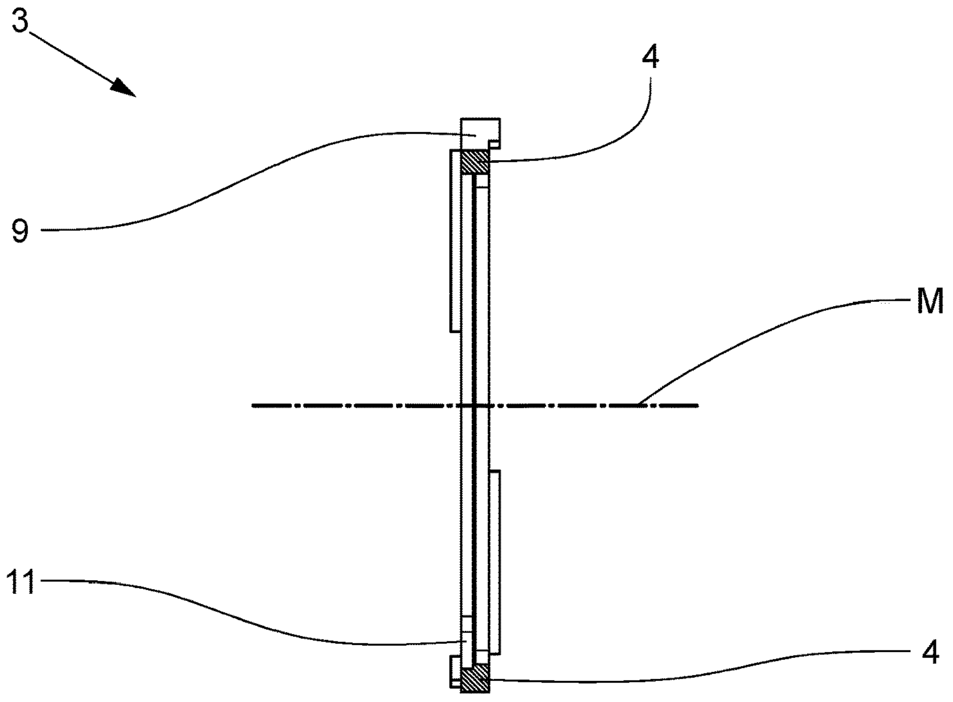
Figure 4:
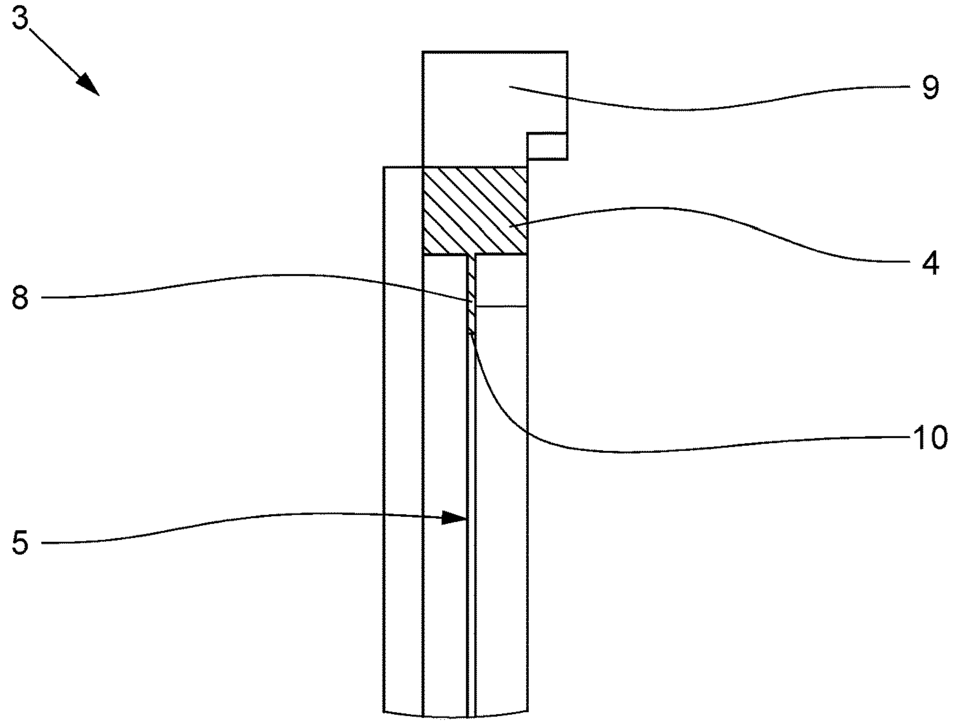
Figure 5:
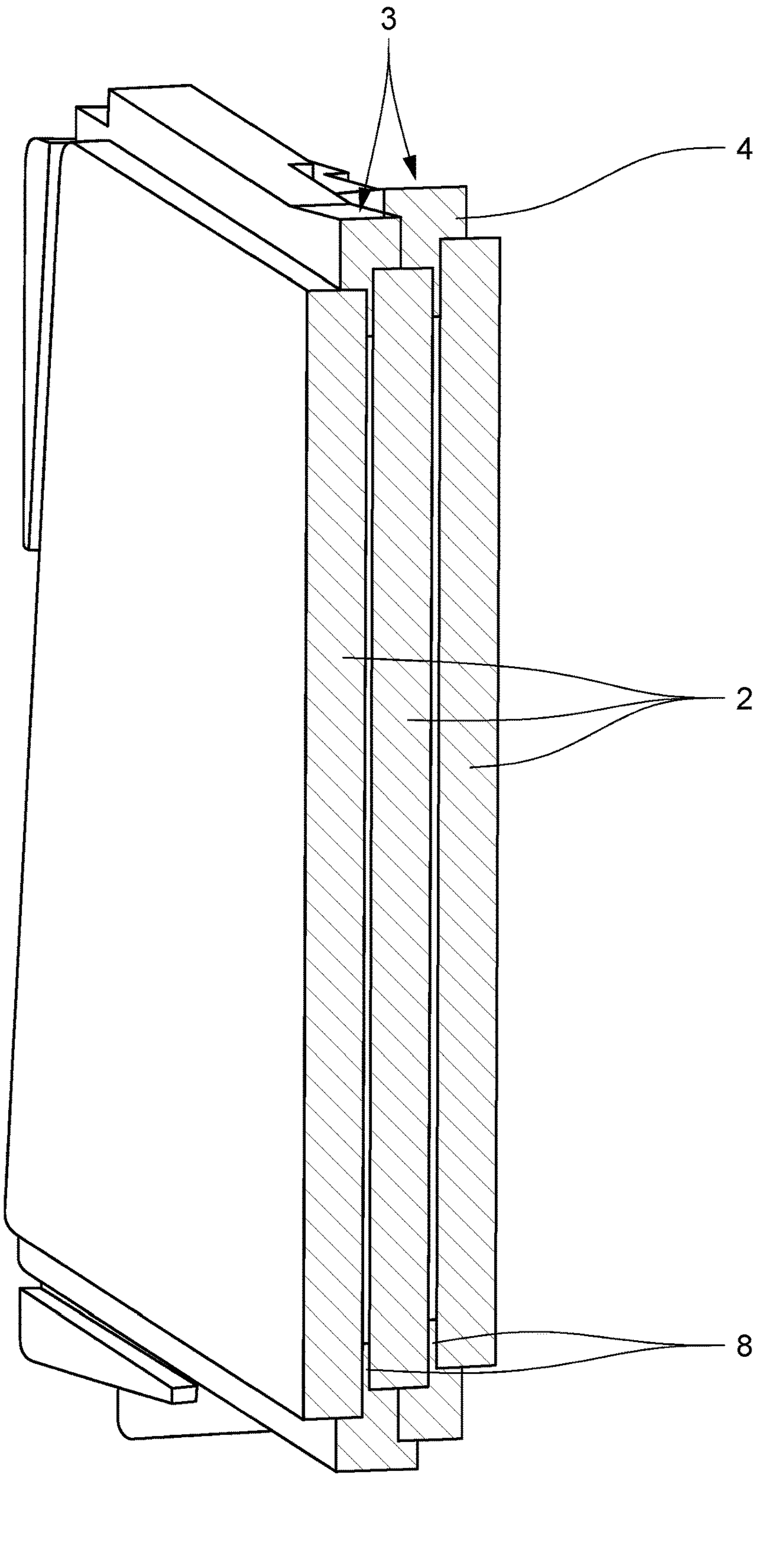
Figure 6:
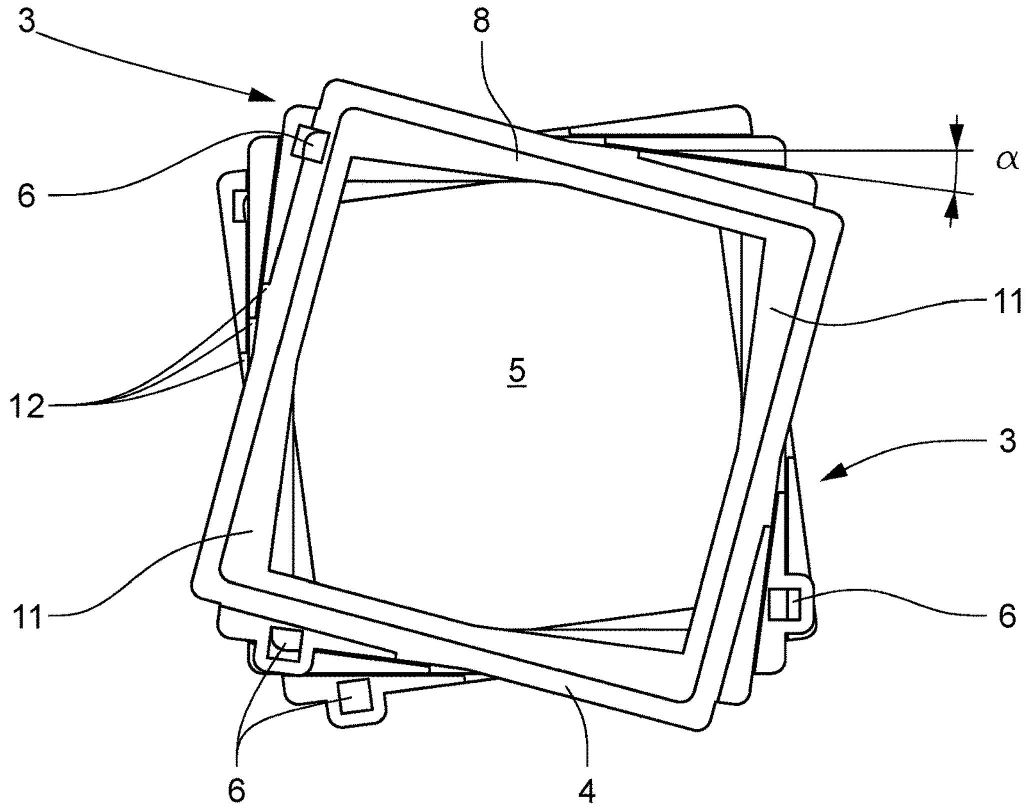
Figure 7:
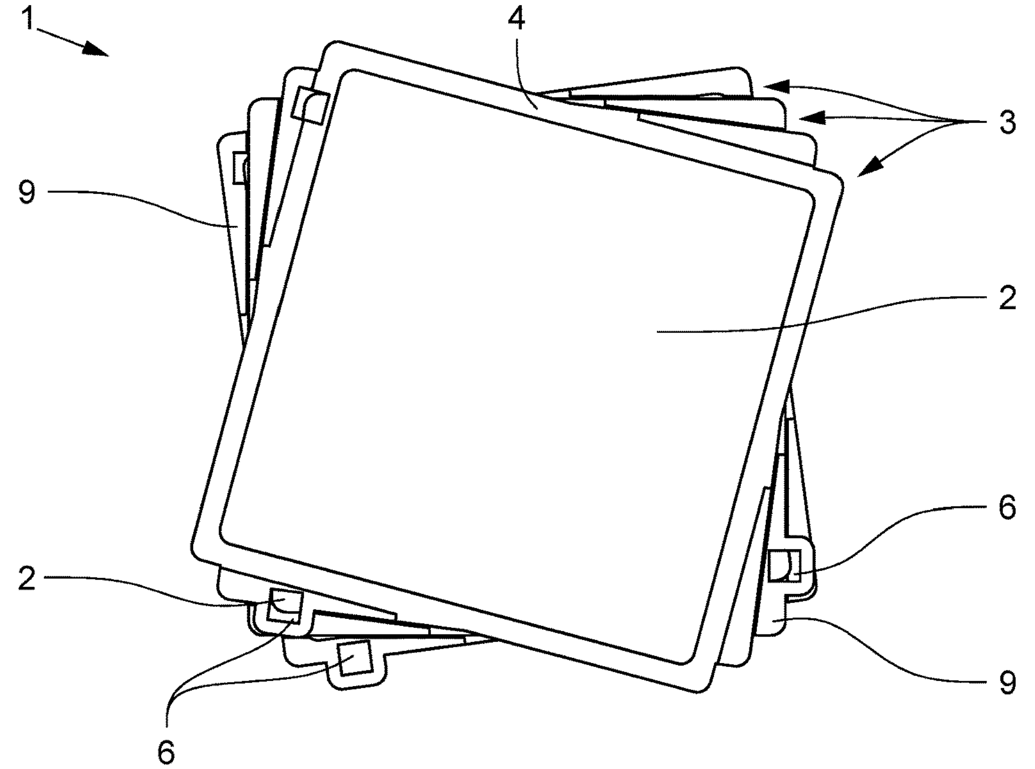
Figure 8:
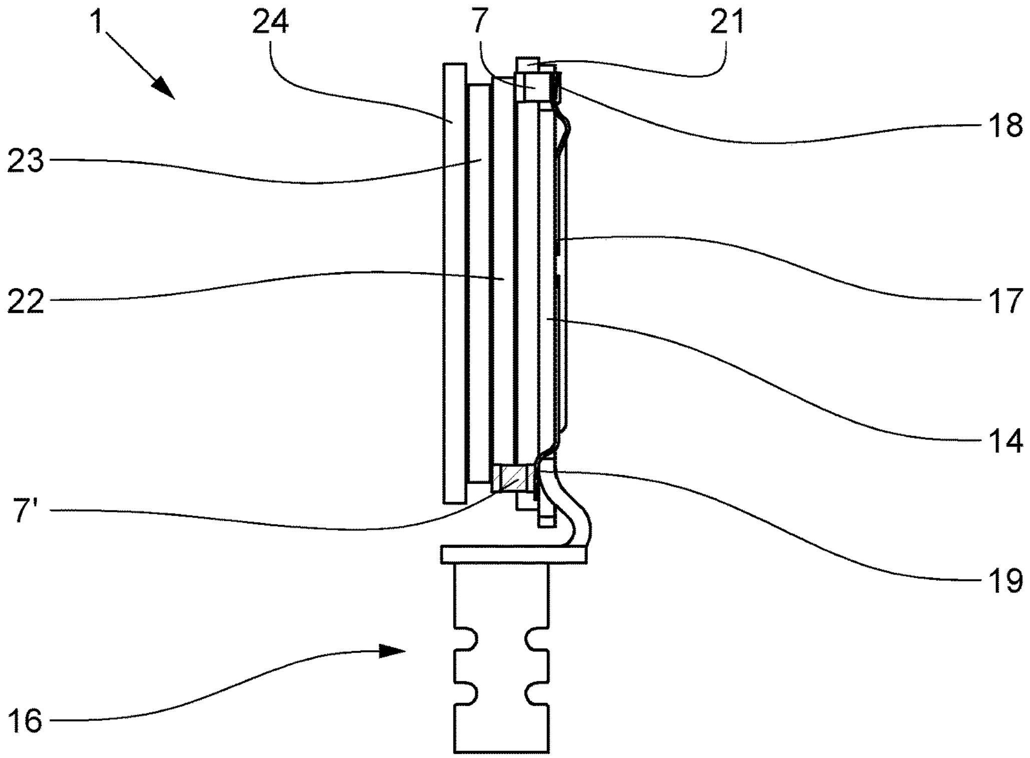
Figure 9:
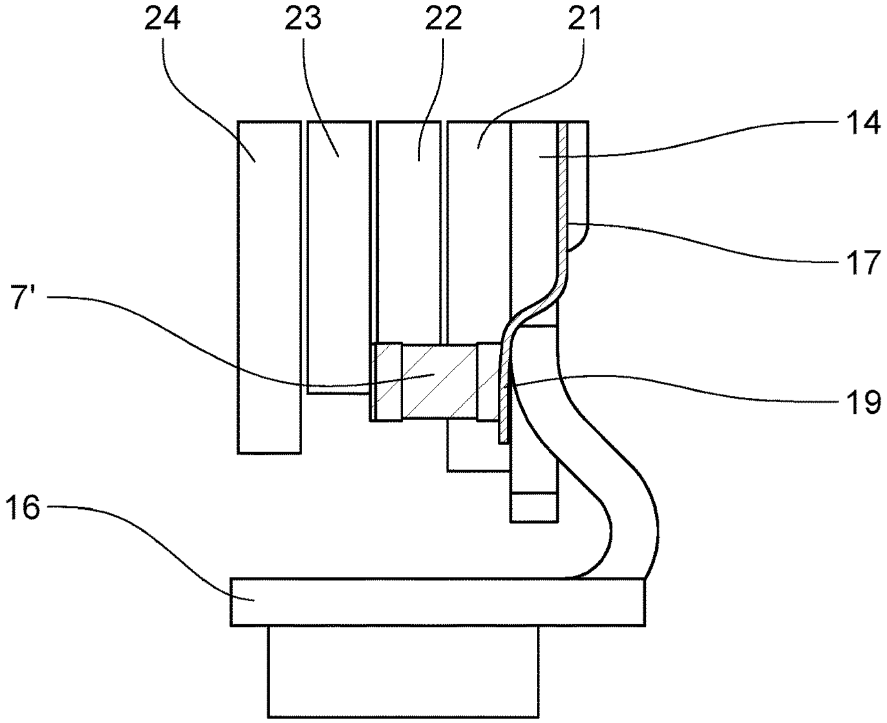

FIG. 1 shows a spark gap arrangement with four electrodes and three holding frames, in an exploded diagram, FIG. 2 shows a holding frame, in top view, FIG. 3 shows a sectional view of the holding frame according to FIG. 2, FIG. 4 shows an enlarged detail of the holding frame as shown in FIG. 3, FIG. 5 shows a sectional view of two holding frames with three accommodated electrodes, FIG. 6 shows three holding frames that are arranged offset relative to one another, FIG. 7 shows three holding frames that are arranged offset relative to one another, with an electrode inserted into the upper holding frame, FIG. 8 shows a sectional view of four electrodes arranged in a stack arrangement with two control elements, and FIG. 9 shows an enlarged detail of arrangement as shown in FIG. 8.

DETAILED DESCRIPTION OF THE DRAWINGS

The figures show a spark gap arrangement 1 or electrodes 2 and holding frames 3 for a spark gap arrangement 1, wherein each holding frame 3 can partially accommodate two electrodes 2. A spark gap arrangement 1 consists of at least three electrodes 2 and at least two holding frames 3 that accommodate the electrodes 2, wherein the holding frames 3 are arranged flat one on top of the other. Even if only three holding frames 3 are depicted in FIG. 1, the number of holding frames 3 and thus also the number of electrodes 2, which are part of the spark gap arrangement 1, is not limited thereto; rather, a spark gap arrangement 1 can also have considerably more electrodes 2 and thus also considerably more holding frames 3. In principle, a spark gap arrangement 1 can accommodate a total of n−1 electrodes 2 with n holding frames 3.

An exploded diagram of such a spark gap arrangement 1 is depicted in FIG. 1. The depicted spark gap arrangement consists of three holding frames 3, 3', 3" and four electrodes 2, of which, however, only three electrodes 2 are visible. In the central holding frame 3', only the front electrode 2, which is arranged in the mounted state between the front holding frame 3 and the central holding frame 3', is visible. The electrode that is arranged in the mounted state between the central holding frame 3' and the rear holding frame 3" is not visible. This electrode is also arranged in the central holding frame 3', but in the depiction according to FIG. 1 is covered by the first, front electrode 2 that is arranged in the central holding frame 3'.

From the depiction of the spark gap arrangement 1 and also from the depiction of an individual holding frame 3 according to FIG. 2, it is evident that the holding frame 3 has an edge 4, which surrounds a recess 5 for accommodating an electrode 2. In the depicted embodiment, electrodes 2 are rectangular, in particular square, so that even the recess 5 that is surrounded by the edge 4 is rectangular or square. In the depicted embodiment, in addition, edge 4 of the holding frame 3 is completely circumferential. In principle, however, it is also possible that the edge has interruptions so that a more reliable accommodation of an electrode 2 is ensured.

In edge 4 of the holding frame 3, in each case a receptacle opening 6 is made, into which opening a control element 7, which can be in particular a capacitor, can be inserted. The control elements 7 of the spark gap arrangement 1 are used to control or trigger the individual spark gaps; to do this, a control element 7 is electrically connected in each case to an electrode 2.

In the spark gap arrangement 1 of the invention, the individual electrodes 2 are not brought into contact—as in the state of the art—on their narrow (edge) side, but rather on the face or the back side of the electrode 2, i.e., on the large surface of the electrode 2.

To this end, the individual holding frames 3 and, with them, the electrodes 2 arranged therein are arranged offset relative to one another around their central axis M arranged perpendicular to the plane of the holding frame 3 in such a way that the receptacle opening 6 of a first holding frame 3 is located above an electrode 2, which is accommodated in a second holding frame 3 arranged underneath. As a result, the control element 7 arranged in the receptacle opening 6 of the first holding frame 3 can make contact with the electrodes 2 accommodated in the second holding frame 3, arranged underneath. The spark gap arrangement 1 according to the invention thus has multiple holding frames 3 arranged one on top of the other, which in each case are arranged offset relative to one another around the central axis M, so that an offset-mounted stack of holding frames 3 is produced, which in each case accommodate two electrodes 2. As is evident in particular from FIG. 2, the receptacle opening 6 is arranged close to one corner of the holding frame 3, so that a control element 7 inserted in the receptacle opening 6 contacts the underlying electrodes 2 in the area of a corner as well.

It can also be seen from FIG. 2 that the holding frame 3 has a collar-shaped support section 8 facing inward toward the central axis M, on which in each case an electrode 2 rests on the two sides, when it is accommodated by the holding frame 3. In the direction of the central axis M, the electrodes 2 are thus held in their positions by, in particular, the support section 8. In addition to the function of positioning an electrode 2 in the holding frame 3, the support section 8 also assumes the function of the insulation film, otherwise commonly used in the stack spark gaps, between the individual electrodes 2. The thickness of the individual holding frame 3 as well as the thickness and the position of the support section 8 in the holding frame 3 determines in this case at which distance the individual electrodes 2 are arranged relative to one another in the mounted state.

In the depicted embodiment, the collar-shaped support section 8 is seen in the direction of the central axis M, arranged in the middle in the holding frame 3, as is evident in particular from the sectional view according to FIG. 3 and the enlarged detailed depiction according to FIG. 4. In this case, it is evident from the sectional view according to FIG. 5 that the distance between two electrodes 2 is determined by the thickness of the support section 8 of the holding frame 3. This sectional view also shows how three electrodes 2 are accommodated by two holding frames 3, 3', wherein the central electrode 2 is arranged between the two holding frames 3, 3' and is thus accommodated by two holding frames 3, 3' together. In addition, it is evident from the depiction according to FIG. 5 that in each case, an electrode 2 rests on both sides of the collar-shaped support section 8 of a holding frame 3.

Even if the individual electrodes 2 have a rectangular, in particular square, shape and thus also the edge 4 of the holding frame 3, which surrounds an accommodated electrode 2 on the outside, has a square shape, both the outside contour and the inside contour of the holding frame 3 deviate from the shape of a rectangle. The outside contour of the holding frame 3 that deviates from a rectangle is used to make space available for the arrangement of the receptacle opening 6 for the control element 7. In the depicted embodiment, the holding frame 3 has, on all four sides, an outward-facing section 9 that rises in each case toward a respective corner, wherein only in two of these sections 9 is a receptacle opening 6 made in each case.

The inside contour of the holding frame 3 that deviates from the shape of a rectangle is characterized wherein the support section 8 has an inside edge 10 that is not rectangular. The collar-shaped support section 8 to this end has, on all four sides, an inward-projecting section 11 that rises in each case toward a corner. In this case, an outward-rising section 9 of the holding frame 3 and the inward-rising section 11 of the support section 8 are arranged offset relative to one another in such a way that the two sections 9, 11 of a side of the holding frame 3 do not face one another. In the top view of a holding frame 3 depicted in FIG. 2, the latter thus seems to consist of two, in each case square, holding frames arranged offset relative to one another at an angle.

The above-described configuration of the support section 8 ensures that the latter has an octagonal inside edge, wherein the eight inside angles are not all of the same size. Rather, the inside edge 10 has four smaller inside angles $\delta_1$ and four larger inside angles $\delta_2$, wherein the smaller inside angles $\delta_1$ and the larger inside angles $\delta_2$ are arranged to alternate relative to one another. The inside angle $\theta_1$ is $90°+\alpha$, and the inside angle $\theta_2$ is $180°-\alpha$, wherein the angle $\alpha$ corresponds to the offset angle of two holding frames 3 relative to one another. This angle $\alpha$ can lie in particular in the range between 5 and 10°, so that the first inside angle $\theta_1$ is between 95° and 100°, and the second inside angle $\theta_2$ is between 170° and 175°.

FIG. 6 shows by way of example three holding frames 3 arranged one on top of the other, which frames are arranged offset relative to one another around their central axis M. The offset angle $\alpha$ between the first holding frame 3 and the second holding frame arranged underneath is in this case 7.5°. FIG. 7 shows the same arrangement of three holding frames 3, wherein the individual holding frames 3 in each case accommodate two electrodes 2, which together form a spark gap. The electrode 2 arranged between the first holding frame 3 and the second holding frame 3' is in this case visible through the receptacle opening 6 in the first, upper holding frame 3, so that a control element 7 that is inserted into the receptacle opening 6 can make contact with this electrode 2 on its face.

So that the individual holding frames 3 remain in their desirable arrangement offset relative to one another, the individual holding frames 3 are halted in their offset arrangements. To this end, in each case, a halting element 12 is made on the sides of the holding frame 3, which element works together with the corresponding halting element 12 of a second holding frame 3 when the two holding frames 3 are stacked one on top of the other. As is evident from the exploded diagram of the spark gap arrangement 1 according to FIG. 1, the mounting of an overvoltage protector with such a spark gap arrangement 1 is also very easy, since the individual components can be stacked in succession on one another. In this case, the mounting can be carried out in particular from one direction.

To make an electrical connection with the spark gap arrangement 1, moreover, two contact plates 13, 14 are also provided, wherein in this case, the contact plate 13 is provided for connecting a PE conductor, and the contact plate 14 is provided for connecting a neutral conductor. Moreover, depicted in FIG. 1 is a housing half shell 15, which forms a part of a housing that accommodates the spark gap arrangement 1. In this case, the dimensions of the housing half shell 15 are only slightly larger than the outside dimensions of the spark gap arrangement 1 or the individual holding frame 3, since no additional installation space is required for the control elements 7.

Making contact with individual electrodes 2 by control elements 7 is evident from the sectional view according to FIGS. 8 and 9, wherein in the two sectional views, only the electrodes 2 are depicted in their positions, offset relative to one another and preset by the holding frame 3, but not the holding frame 3 itself. The first electrode 21 arranged on the far right is brought into contact on one side of the contact plate 14, which in turn is connected to a connecting element 16 to make an electrical connection with a neutral conductor. Located on the other side of the first electrode 21 is the second electrode 22, which is separated from one another by the support section, arranged between two electrodes 21, 22, of the first holding frame, so that the two electrodes 21, 22 form a first spark gap. Accordingly, the second electrode 22 and the third electrode 23 arranged adjacent with some distance between them form a second spark gap, and the third electrode 23 and the fourth electrode 24 also arranged adjacent at a distance form a third spark gap of the spark gap arrangement 1. The side of the fourth electrode 24 facing away from the third electrode 23 is then connected to the contact plate 23, not depicted here, which is provided to make a connection with a PE conductor.

A busbar 17 is arranged nn the side of the contact plate 14 facing away from the first electrode 21, and is connected in an electrically-conductive manner to the contact plate 14, wherein the two ends 18, 19 of the busbar 16 in each case make contact with a first connector of a control element 7, 7'. The first control element 7 depicted above in FIG. 8 is arranged in a first opening 6 in the first holding frame 3. As a result, the second electrode 22, which is arranged offset relative to the first electrode 21 in the first holding frame 3, can be brought into contact on its face with its second connector, without touching the first electrode 21 with its second connector.

The second control element 7' depicted in FIG. 8 at the bottom and in FIG. 9 is arranged in a second opening 6 in the first holding frame 3. This control element 7' can thus be brought into contact on its face with its second connector to the third electrode 23, which is arranged in the second holding frame 3', without the first electrode 21 and the second electrode 22 contacting its second connector. Since the two control elements 7, 7' in each case are arranged in an opening 6 in the first holding frame 3, the necessary insulation intervals between the control elements 7, 7' themselves as well as between the control elements 7, 7' and the electrodes 21, 22 that are not brought into contact with them can also be maintained.

REFERENCE SYMBOLS

1 Spark gap arrangement
2 Electrodes
3 Holding frame
4 Edge
5 Recess
6 Receptacle opening
7 Control element
8 Support section
9 Section, outside
10 Inside edge
11 Section, inside
12 Halting element
13 Contact plate PE
14 Contact plate N
15 Housing half shell
16 Connecting element
17 Busbar
18, 19 Ends of the busbar
M Central axis
$\alpha$ Offset angle
$\delta_1$ Inside angle
$\delta_2$ Inside angle

What is claimed is:

1. A spark gap arrangement, comprising:
at least three electrodes and
at least two holding frames which are arranged flat one on top of the other, wherein the holding frames in each case have an edge, which surrounds a recess for accommodating at least one electrode,
wherein at least one receptacle opening is made in the edge of at least one holding frame, in which opening a control element is arranged, and
wherein each holding frame is arranged offset relative to another holding frame around a central axis thereof, which is arranged perpendicular to a main plane of the holding frame, in such a way that the receptacle opening of a first of the holding frames is located above an electrode accommodated in a second of the holding frames arranged underneath the first of the holding frames, so that the control element arranged in the receptacle opening of the first of the holding frames makes contact with the electrode that is accommodated in the second of the holding frames.

2. The spark gap arrangement according to claim 1, wherein the at least one receptacle opening is arranged close to a corner of the holding frames.

3. The spark gap arrangement according to claim 1, wherein each of the holding frames has a collar-shaped support section facing inward toward the central axis on which at least one electrode comes to rest.

4. The spark gap arrangement according to claim 3, wherein the holding frames have an outside contour and an inside contour, the inside contour deviating from that of a rectangle.

5. The spark gap arrangement according to claim 4, wherein two holding frames are arranged offset relative to one another at an angle $\alpha$, characterized wherein the collar-shaped support section has an octagonal inside edge, wherein four inside angles $\delta_1$ have a value of $90°+\alpha$, and four inside angles $\delta_2$ have a value of $180°-\alpha$, and wherein the inside angles $\delta_1$ and $\delta_2$ alternate relative to one another.

6. The spark gap arrangement according to claim 1, wherein the holding frames are halted held the offset arrangement relative to one another.

7. The spark gap arrangement according to claim 6, wherein each of the holding frames has at least one holding element on at least one side, wherein two holding elements of two holding frames work together when the two holding frames are stacked one on top of the other.

8. The spark gap arrangement according to claim 1, wherein each of the electrodes is a rectangular, thin disk made of graphite or a tungsten-copper composite material.

9. The holding frame for a spark gap arrangement according to claim 1, having an edge, which surrounds a recess for accommodating at least one electrode, wherein at least one receptacle opening for accommodating a control element is located in the edge.

10. The holding frame according to claim 9, wherein the holding frame has a collar-shaped support section facing inward toward the central axis M.

11. The holding frame according to claim 10, wherein the holding frames have an outside contour and an inside contour, the inside contour of the holding frame deviating from that of a rectangle and wherein the collar-shaped support section has an octagonal inside edge, wherein four inside angles $\delta_1$ have a value of $90°+\alpha$, and four inside angles $\delta_2$ have a value of $180°-\alpha$, and wherein the inside angles $\delta_1$ and $\delta_2$ are arranged to alternate relative to one another.

12. The holding frame according to claim 9, wherein on at least one side, at least one holding element is provided to hold one of the holding frames to another of the holding frames.

* * * * *